United States Patent [19]

Ejiri et al.

[11] Patent Number: 5,034,825

[45] Date of Patent: Jul. 23, 1991

[54] HIGH QUALITY IMAGE SCANNER

[75] Inventors: Koichi Ejiri, Cupertino; Kevin Corcoran, Fremont; Sanjiv Arora, San Jose, all of Calif.

[73] Assignee: Ricoh Corporation & Ricoh Company Ltd., Menlo Park, Calif.

[21] Appl. No.: 353,006

[22] Filed: May 17, 1989

[51] Int. Cl.$^5$ .............................................. H04N 1/04
[52] U.S. Cl. ..................................... 358/475; 356/390
[58] Field of Search ............... 358/475, 105, 106, 405, 358/406, 450; 356/229, 230, 231, 433, 434, 390, 375

[56] References Cited

U.S. PATENT DOCUMENTS 4,853,739  8/1989  Miyamoto ........................... 358/475
4,910,601  3/1990  Gerlach .............................. 358/474

Primary Examiner—Edward L. Coles, Sr.
Attorney, Agent, or Firm—Heller, Ehrman, White & McAuliffe

[57] ABSTRACT

A high quality image scanner is provided which processes multiple scanned images into a composite image with a large dynamic range. The two scanned images are processed to identify maximum local similarity.

9 Claims, 4 Drawing Sheets

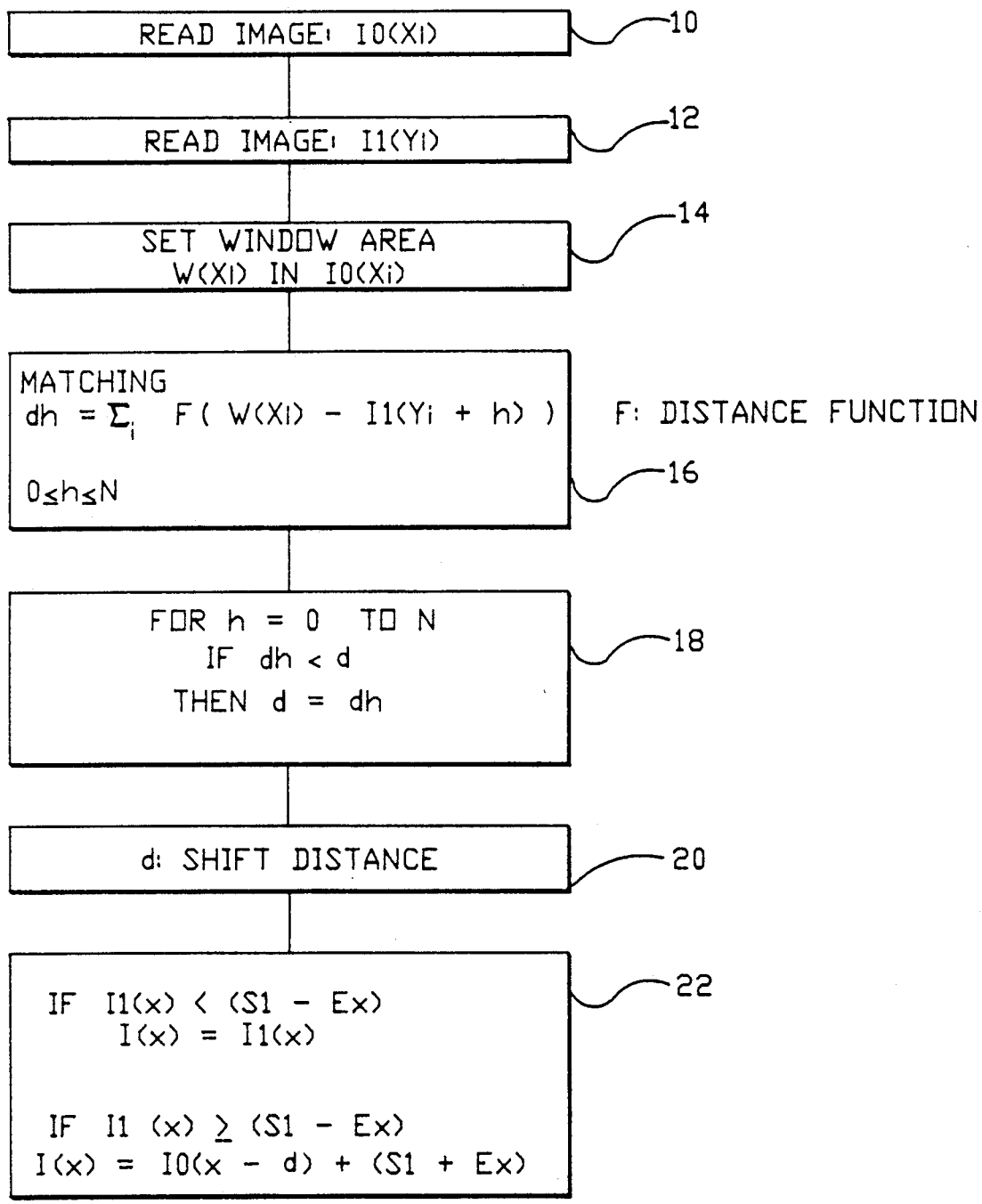
FIG.—1

HIGH QUALITY IMAGE SCANNER

BACKGROUND OF THE INVENTION

The present invention relates to an image scanner and more particularly to a high quality image scanner for scanning an image on a document.

Digital image processing, especially high quality color scanner image processing, provides high quality color images such as appear on a document. However, the long bit length for each color pixel requires an expensive analog-digital converter as well as an expensive CCD device, which necessarily increases the cost of the scanner. Also, the CCD has limited dynamic range.

Half-tone images have long been used in publication through printing. One of the more important areas in this activity is image editing, the rearrangement of the half-tone levels. Because there are so many limitations on printing, these limitations must be voided by image editing.

Printed materials are the means by which a designer expresses his ideas through publications. But digital printing processes can afford to express the half-tone images approximately less than 100-200 levels. This means that an image should be expressed in less than 100-200 levels. The images are printed as they were taken, but if the original image has large dynamic range, such as in color slides, there is a need to rearrange the tones of images to express the author's ideas more eloquently.

For example, even through the original image does not look bright, the author can impress a reader with bright images only if the image has larger dynamic range. It is said that half-tone images are required to have more than 8 bits/pixels, in general.

It is very important for the printing expert to arrange the grayness within the 100-200 levels. There are many techniques available to manipulate the grayness modification. In color printing processes, this is more important, because hue or color tones are more susceptible to the change of half-tone levels.

SUMMARY OF THE INVENTION

It is an object of the present invention to provide a high quality image scanner. The present invention utilizes a multiple scanning method in which an image on a document is first scanned with low illumination and then scanned with high illumination. The scanned images are then identified by a corresponding position and then the scanned images are combined into a composite image.

The present invention provides an improved signal to noise ratio by utilizing image processing from the two images obtained by each scanning.

Other objects, features and advantages of the present invention will become apparent from the following detailed description when taken in conjunction with the drawings.

BRIEF DESCRIPTION OF THE DRAWINGS

FIG. 1 depicts a diagram of an improved image processing algorithm according to the present invention.

FIGS. 3-1, 3-2 and 3-3 and the results of test data utilizing the present invention.

DETAILED DESCRIPTION OF THE DRAWINGS

Figures 1, 3:
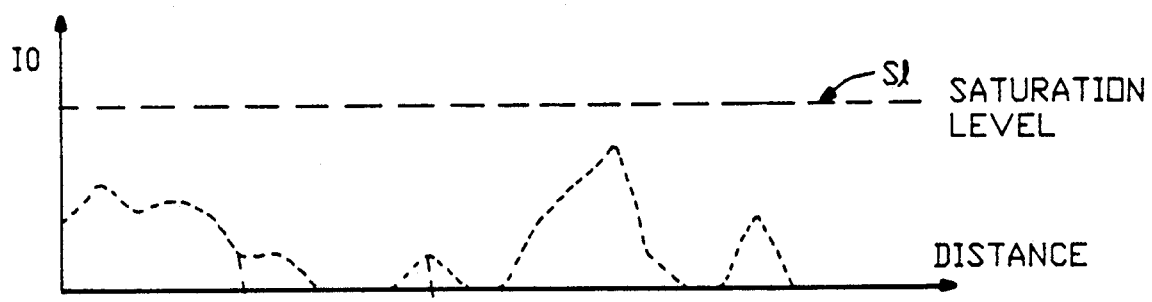
Figures 2, 3:
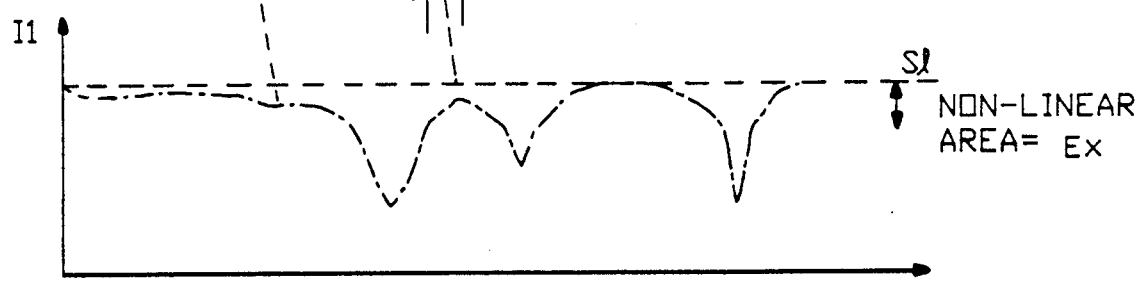
Figure 3:
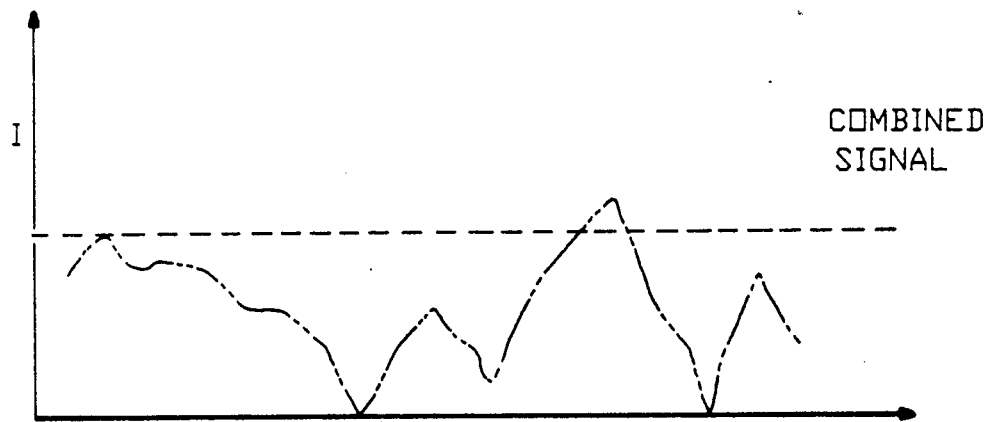

Referring now to FIG. 1, the basic algorithm of an improved image processing procedure according to the present invention is depicted.

The first step in connection with providing an improved image is to read an image with low illumination and is indicated at step 10. The next procedure is to scan the same image with high illumination, as indicated at step 12.

The present invention identifies the corresponding position in the two images scanned, and then the two images are combined into a composite improved image.

The matching algorithm is shown at steps 14, 16, 18 of FIG. 1.

Figure 2:
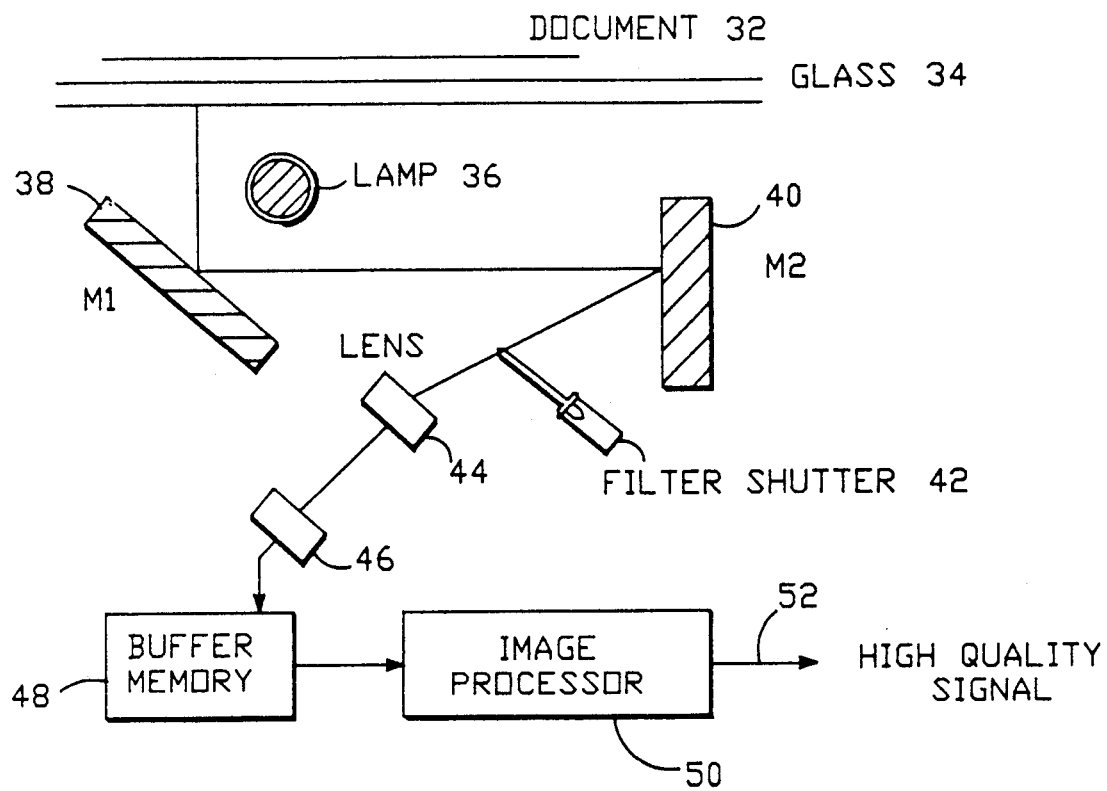
FIG. 2 depicts a block diagram of an image scanner according to the present invention.

FIG. 2 shows a schematic diagram of an improved image scanner 30, according to the present invention. In FIG. 2, a document 32 is placed above the scanner glass 34. Illumination is provided by lamp 36, and its reflected light is guided to CCD sensor 46 through mirrors 38, 40, filter shutter 42 and lens 44.

Filter shutter 42 is alternately inserted into the optical path between mirror 40 and lens 44 when lower illumination is required.

The output of CCD sensor 46 is input to a suitable buffer memory 48 which stores the scanned images. Image processor 50 retrieves the scanned image data in buffer memory 48 and processes the image signal according to the algorithm explained below. Image processor outputs a high quality signal on lead 52.

The two scanned images which are stored in buffer memory 48 of FIG. 2 are not the same, because they are scanned under different conditions. Usual mechanical precision does not allow the two images to be in exactly the same position. A shift of a few pixels has been observed between two images in normal operation. It is desirable, therefore, in order to obtain a high quality image, to identify this shift distance.

There are several methods to obtain this value. Considering the possibility that the scanner's mechanical devices vibrate during scanning, the scanned images are used as a reference to identify the corresponding positions.

If the two locations in each image are the same (matched), then the two positions must be the identical position. The distance between the two locations is the shift distance of two images.

According to several tests, the best matching technique appears to be a statistical method based on a correlation function. A simple subtraction method is not effective in this case.

FIGS. 3-1, 3-2 and 3-3 show the results of matching test based upon a correlation function.

FIG. 3-1 is the model data of a low illumination image, and FIG. 3-2 is a model of data relating to a high illumination image.

For images with different conditions, an intercorrelation matrix is believed to be the best matching method.

Two methods to identify the shift distance, D, of two images are described below.

$$d = \text{Mindis}\left(abs\left(\frac{\text{sum}((I0(Xi) - I1(Yj)))}{S}\right)\right),$$

where, Mindis(sum(IO(Xi)-Il(Yj))) is the distance between the two corresponding position "Xi-Yj" where summation "sum(IO(Xi)-Il&Hj))" has the minimum value. The function "abs(x)" is the absolute value of x, "sum(Xi)" is the summation of Xi for i in the predefined area S. This method sometimes makes errors because the two images, IO(Xi) and Il(Yj), are differently illuminated even for the same area.

$$d = \text{Maxdis}(\text{Corr}(I0(Xi), I1(Yj))),$$

here, Maxdis(x) means the distance which "x" has the largest value when $b\,d = Xi - Yj$. Corr($I0(Xi), I1(Yj)$) is the correlation function defined below;

$$\text{Corr}(I0(Xi), I1(Yj)) = \frac{n \sum_{Xi} \sum_{Yj} I0(Xi) I1(Yj) - \sum_{Xi} I0(Xi) \sum_{Yj} I1(Yj)}{\left(n \sum_{Xi} I0(Xi)I0(Xi) - \sum_{Xi} I0(Xi) \sum_{Xi} I0(Xi)\right)\left(n \sum_{Yi} I1(Yi)I1(Yi) - \sum_{Yi} I1(Yi) \sum_{Yi} I1(Yi)\right)}$$

The graphs in FIGS. 3-1 and 3-2 show the image data scanned in different conditions, low illumination and high illumination. To get the low illumination image (IO), the filter shutter in FIG. 2 was inserted to avoid the saturation of signals. Each CCD 46 has a limited dynamic range. Therefore, the dark area is under-saturated.

On the other hand, with high illumination, a dark area reflects enough light to be sensed at more than under-saturation levels. In this case, however, the over-saturated area will appear.

Figure 4:
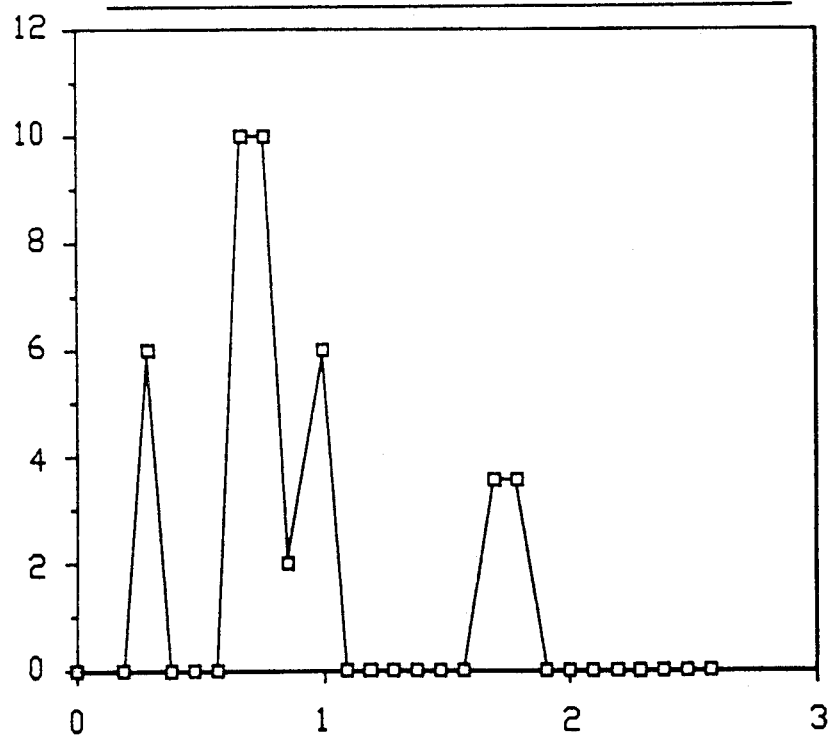
FIG. 4 a typical image which is unsaturated.
Figure 5:
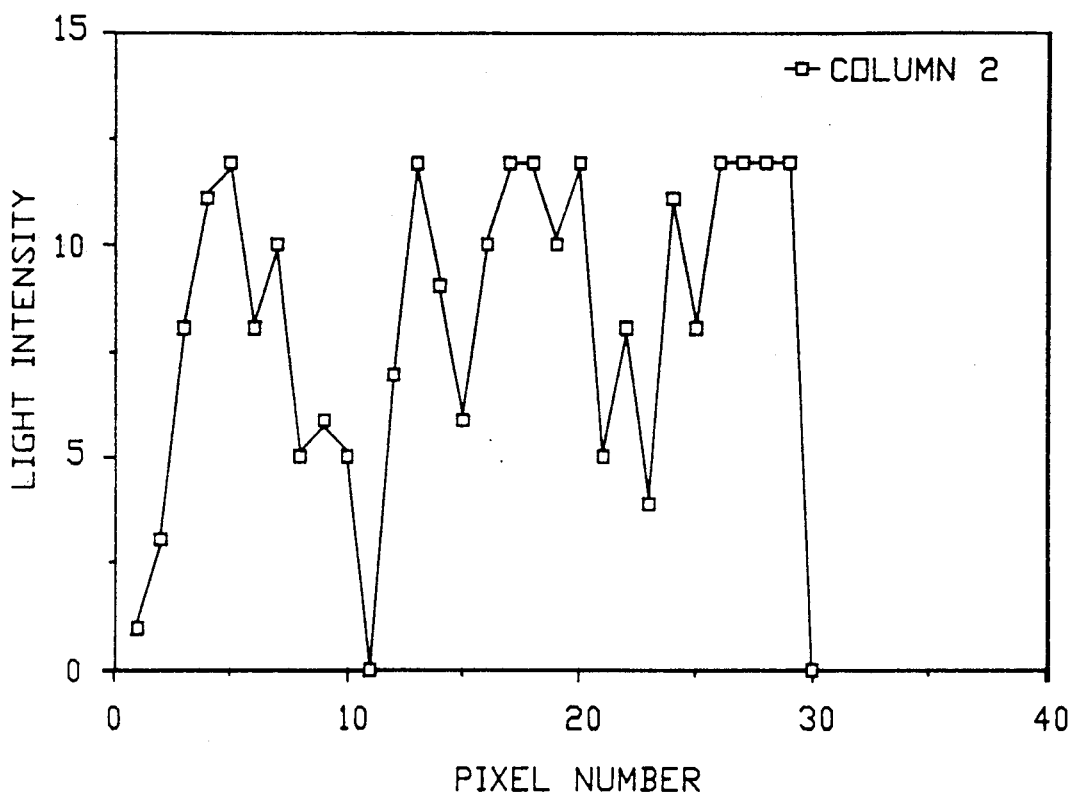
FIG. 5 depicts a typical image which is oversaturated.

FIGS. 4 and 5 show the typical images illuminated by different conditions.

After determining the distance between the corresponding position in the two images, using the algorithm described above, the two images can be combined as follows:

$$I(x) = I0(x-d) + C1 + Th*C2$$

where d is the shift distance between the two images defined above. Th=Sl−Ex and C1, C2 the constant empirically determined from the given scanner.

Figure 6:
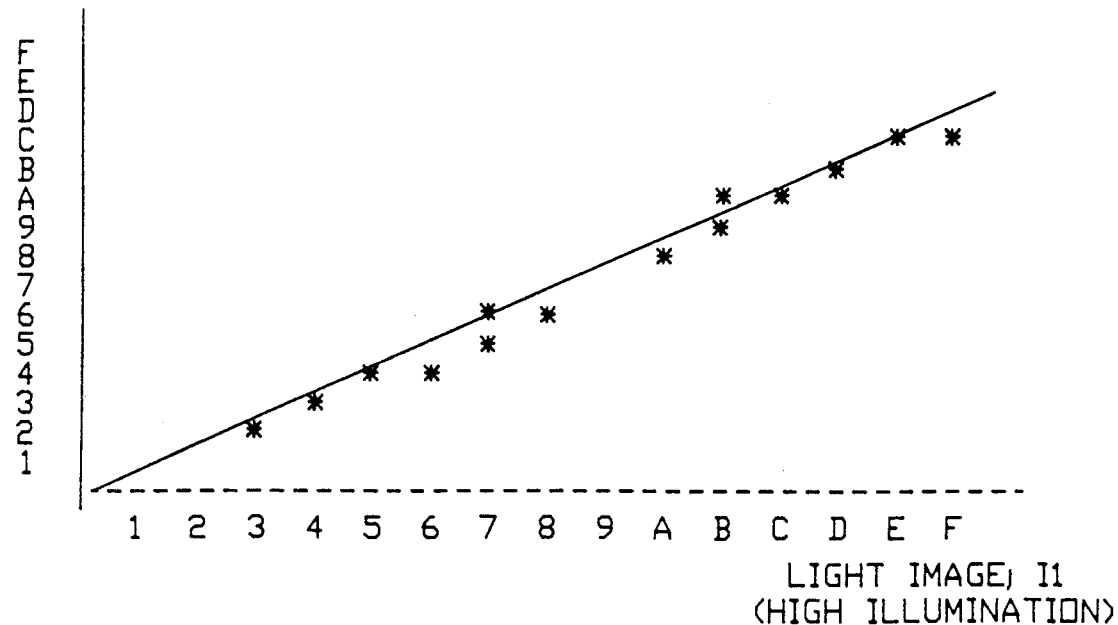
FIG. 6 depicts an example of two images merging.

FIG. 6 shows an example of two images merging. The two images, on illuminated with low intensity, the other with high intensity, were merged together by the following expressions:

If Il (light image) is less than level "A", IM (merged Image)=Il,

If Il>"A",

Im=IO+2+(IO−A)/3.

Another alternative for filtered scanning is to change the driving clock of the CCD 46. The slower clock accumulates more charge in CCD sensors, which causes the same effect of high illumination scanning. Other processes are exactly the same as before.

What is claimed is:

1. An image scanner comprising
   means for scanning an image on a document with a first low illumination level,
   means for scanning said image with a second high illumination level,
   means for storing the relative positions of the first and second scanned images where there is a shift distance between said scanned images,
   means for determining the corresponding positions in the first and second scanned images, and
   means for combining said first and second scanned images into a composite image.

2. The image scanner as in claim 1 including filter shutter means for scanning said image with said first and second illumination levels.

3. The image scanner as in claim 2 including buffer memory means for storing the first and second scanned images.

4. The image scanner as in claim 3 including image processor means for processing the scanned images in said buffer means to form said composite image.

5. The scanner as in claim 4 including means for determining the shift distance between the positions of said first and second images stored in said buffer memory means.

6. The scanner as in claim 5 including means for manipulating tonal variations in the image.

7. The scanner as in claim 6 including means for compensating for non-uniformity in the image.

8. An image scanner comprising
   means for scanning an image on a document with multiple illumination levels,
   means for determining the corresponding positions in the multiple scanned images, and
   means for combining said multiple scanned images into a composite image.

9. In an image scanner, the method comprising the steps of
   scanning an image on a document with a first low illumination level,
   scanning said image with a second high illumination level,
   storing the relative positions of the first and second scanned images where indicated where there is a shift distance between said scanned images,
   determining the corresponding positions in the first and second scanned images, and
   combining the first and second scanned images to form a composite image.

* * * * *